United States Patent
Hashimoto

(10) Patent No.: US 10,309,368 B2
(45) Date of Patent: Jun. 4, 2019

(54) POWER GENERATION APPARATUS UTILIZING WATER CURRENT ENERGY

(71) Applicant: Chikao Hashimoto, Shimonoseki (JP)

(72) Inventor: Chikao Hashimoto, Shimonoseki (JP)

( * ) Notice: Subject to any disclaimer, the term of this patent is extended or adjusted under 35 U.S.C. 154(b) by 478 days.

(21) Appl. No.: 15/030,688

(22) PCT Filed: Oct. 22, 2013

(86) PCT No.: PCT/JP2013/078606
§ 371 (c)(1),
(2) Date: Apr. 20, 2016

(87) PCT Pub. No.: WO2015/059772
PCT Pub. Date: Apr. 30, 2015

(65) Prior Publication Data
US 2016/0237984 A1   Aug. 18, 2016

(51) Int. Cl.
*F03B 13/10* (2006.01)
*F03B 17/06* (2006.01)
*F03B 13/26* (2006.01)

(52) U.S. Cl.
CPC ............ *F03B 17/065* (2013.01); *F03B 13/10* (2013.01); *F03B 13/264* (2013.01); *F05B 2250/80* (2013.01); *Y02E 10/28* (2013.01)

(58) Field of Classification Search
USPC .................................. 416/117, 118, 119, 140
See application file for complete search history.

(56) References Cited

U.S. PATENT DOCUMENTS

| 401,751 A * | 4/1889 | Le Beau ........................ 416/117 |
| 1,707,381 A * | 4/1929 | Adams .................. F03B 17/065 |
| | | 416/117 |
| 3,920,354 A * | 11/1975 | Decker ................... F03D 3/067 |
| | | 416/117 |
| 4,045,148 A | 8/1977 | Morin |

(Continued)

FOREIGN PATENT DOCUMENTS

| GB | 2464744 A * | 4/2010 | ............ F03B 17/065 |
| JP | 51-069735 A | 6/1976 | |

(Continued)

OTHER PUBLICATIONS

Bulletin of the Japan Society of Naval Architects and Ocean Engineers (Kanrin) No. 41, Mar. 20-23, 2012, with partial English translation.

*Primary Examiner* — Jason D Shanske
*Assistant Examiner* — Theodore C Ribadeneyra
(74) *Attorney, Agent, or Firm* — Foley & Lardner LLP

(57) ABSTRACT

To an installation base fixed to the seabed surface, a vertical cylindrically shaped rotating body is attached to be able to rotate. Mounting frames are attached in a radially manner from the outer circumference of the rotary body. At the top side positions of the mounting frames, pressure receiving plates of flat plate shapes, of a specific gravity slightly smaller and lighter than seawater, and giving rise to buoyancy are attached by butterfly joints to be able to pivot. Further, stoppers and stoppers stopping the pressure receiving plates to within an angular range from slightly below the horizontal or 4° to the substantially vertical or 90° are provided. The rotation of the rotary body is increased to turn the power generator.

2 Claims, 14 Drawing Sheets

(56) References Cited

U.S. PATENT DOCUMENTS

| | | | | |
|---|---|---|---|---|
| 4,113,408 A | * | 9/1978 | Wurtz | F03D 3/068 416/117 |
| 4,134,710 A | * | 1/1979 | Atherton | F03B 17/065 290/53 |
| 4,365,935 A | * | 12/1982 | Zukeran | F03D 7/06 416/117 |
| 6,682,296 B1 | * | 1/2004 | Jonsson | F03B 17/065 415/3.1 |
| 8,459,949 B2 | * | 6/2013 | Lee | F03D 3/02 416/117 |
| 10,030,629 B2 | * | 7/2018 | Huang | F03D 3/067 |
| 2002/0187038 A1 | * | 12/2002 | Streetman | F03D 3/067 415/3.1 |
| 2003/0201645 A1 | * | 10/2003 | Pacheco | B60K 16/00 290/54 |
| 2008/0181777 A1 | * | 7/2008 | Bailey | F03D 3/067 416/117 |
| 2009/0092490 A1 | * | 4/2009 | Brooks | F03D 3/0409 416/24 |
| 2009/0129928 A1 | * | 5/2009 | Sauer | F03B 13/264 416/176 |
| 2009/0180880 A1 | * | 7/2009 | Ersoy | F03D 3/067 416/132 R |
| 2010/0143133 A1 | * | 6/2010 | Bobowick | F03D 3/067 416/117 |
| 2011/0101649 A1 | * | 5/2011 | Harding | B62B 3/008 280/651 |

FOREIGN PATENT DOCUMENTS

| | | |
|---|---|---|
| JP | 56-050270 A | 5/1981 |
| JP | 57-046073 A | 3/1982 |
| JP | 63-055370 A | 3/1988 |
| JP | 63-120869 A | 5/1988 |
| JP | 04-137270 U1 | 12/1992 |
| JP | 2007-270746 A | 10/2007 |
| JP | 2010-518308 A | 5/2010 |
| JP | 2010-523888 A | 7/2010 |
| JP | 4717966 B | 7/2010 |
| JP | 2010-180873 A | 8/2010 |
| JP | 2011-140894 A | 7/2011 |
| JP | 2012-002220 A | 1/2012 |
| JP | 5347048 B | 11/2013 |
| WO | WO 2008/096154 A | 8/2008 |
| WO | WO 2008/125286 A1 | 10/2008 |

* cited by examiner

POWER GENERATION APPARATUS UTILIZING WATER CURRENT ENERGY

CROSS-REFERENCE TO RELATED APPLICATIONS

This application is a National Stage application of PCT/JP2013/078606, filed Oct. 22, 2013.

TECHNICAL FIELD

The present invention relates to a power generation apparatus placed in the sea or a freshwater body for utilizing the current in the sea or freshwater body, in particular the current of the tidal current in the sea, to generate power.

BACKGROUND ART

The utilization of renewable natural energy can be said without exaggeration to be a global issue. The technical problems of hydroelectric power, windpower, solar power, geothermal power, biomass power, etc. are being solved to enable these forms of energy to be actively used throughout the world. However, there are still large technical issues in use of the natural energy of the sea—which is the most promising. There are still few examples where this has been realized. Among these, many attempts have been made in the world relating to tidal power generation, but no universally applicable technology has yet been reported. In tidal power generation, in Japan's case, due to the distribution of tidal currents and water depths, it is necessary to limit the regions in which tidal generation facilities are set and select the drive structure system. The faster the tidal current, the better, but there are few regions where 3 knots or more can be expected. Regions of 2 knots to 1 knot in range are widely distributed from the Seto Inland Sea to the island of Kyushu. The water depth is also shallow at 40 m or so or less. These regions are also close to the land. If considering the drive structure of tidal power generation suitable for such regions, these would be advantageous in terms of fabrication costs and operating costs as well. Wide adaptation and use could be expected.

Regarding the drive structure of tidal current power generation apparatuses as well, the windmill propeller system, boat propeller system, Darrieus turbine wheel system, Sabonius turbine wheel system, etc. and also the fixed blade, crossflow, twisted blade, bucket conveyor system, and numerous other systems have been proposed. All of these have good points and bad points under the harsh ocean conditions and are in the trial stages. None have reached the commercial stage.

As the simplest structure with the smallest manufacturing cost, there is the ground-based waterwheel model which has been utilized from long in the past up to the present. However, if an overshot or undershot water wheel with a horizontal axis in an open path is laid flat and immersed in flowing water, it will not turn as it is. For this reason, water guide plates are used so that the water current is only applied to one side. By doing this, the wheel will turn. This is the crossflow system. Installation of water guide plates at the actual ocean flow, however, would be excessive in cost and impractical both with the fixed system and moving system.

As an improved waterwheel blade type power generation apparatus, PLT 1 discloses the following prior art. This prior art has a structure providing a plurality of blades equally over the entire circumference of a rotary body and providing fluid guide plates for guiding fluid so as to send the fluid to the fluid receiving parts of the blades. This prior art enables the blades to be raised by stopper parts within a predetermined range of angle and form fluid receiving parts. On the other hand, it enables the blades to be laid down at another range of angle. However, if this waterwheel blade type power generation apparatus were placed in the sea where the flow of fluid is reversed in flow direction or changed in direction, the fluid would not be able to be constantly guided to the fluid receiving parts and therefore power generation would become unstable.

On the other hand, PLT 2 discloses a windmill which is comprised of a rotary body around which are attached a plurality of vanes in a radial manner, which uses a gear mechanism to make part of the vanes perpendicular to the flow of air, and which makes the opposite side vanes parallel to the flow of air. However, the mechanism for adjustment of the mounting angle of the vanes of the prior art is complicated and breaks down due to the force acting on the vanes after long years of use. Long term stable operation is judged difficult. Furthermore, depending on this mechanism for adjustment of the mounting angle of the vanes, the energy loss is great and efficient power generation is judged difficult.

At the present time, development of a drive structure for the following such tidal current power generation apparatus meeting the conditions of the sea area covered, has been considered necessary. The conditions of the sea area are a tidal current speed of 2 knots to 1 knot and a depth of 40 m to 10 m or so. To handle changes in direction of the tidal current, simple structures not requiring special mechanisms, such as, crossflow water guide plates, propeller system turning mechanisms, and others, have been considered necessary. Further, it has been desired that (1) the power generation capacity should be one able to generate 100 kW, 500 kW, and further 1000 kW, 2000 kW, etc. for promotion of broad adaptation and use, and (2) the final power generation costs should be minimized, that is, the structure should be made simple so that the manufacturing costs become minimal, and changes in direction of tidal current should be handled to enable reliable power generation without requiring advanced technology and manufacturing precision.

CITATION LIST

Patent Literature

PLT 1: Japanese Unexamined Patent Publication No. 2012-002220
PLT 2: Japanese Patent No. 4717966

SUMMARY OF INVENTION

Technical Problem

The technical problem of the present invention is to eliminate the problems and defects in the prior art structures of power generation apparatuses using ocean current and freshwater current. That is, it is to provide a power generation apparatus utilizing water current energy which enables reliable operation by a simple structure and with long term durability and further enables changes in direction of tidal current and freshwater current to be automatically handled to so as to prevent a drop in power generation. In particular, it is to provide a power generation apparatus suitable for a power generation apparatus using the tidal current at ocean regions with shallow depths close to the land.

Solution to Problem

The present invention solving this problem is configured as follows:
(1) A power generation apparatus utilizing water current energy comprising
an installation base installed in the sea or a freshwater body, a rotary body mounted to the installation base to be able to rotate, and a power generator generating power by rotation of the rotary body with respect to the installation base, wherein a rotary shaft axis of the rotary body is set in a vertical direction becoming substantially perpendicular to a flow plane of water current in the sea or in the freshwater body where it is set, the rotary body has a plurality of mounting frames attached from the rotary body radially, the mounting frames have first ends of flat-plate-shaped pressure receiving plates attached to the mounting frames to be able to pivot at top side positions offset from the rotary shaft axis, and a specific gravity of the pressure receiving plates is set slightly smaller than the specific gravity of the seawater or freshwater where the apparatus is set so as to enable generation of buoyancy in the pressure receiving plates in the sea and freshwater body, stoppers are provided for limiting the ranges of angle of pivot of the pressure receiving plates, output power of the power generator is transmitted by cable to the land close to the installation base or a ship on the sea or freshwater body, the force generated at the pressure receiving plates due to the tidal current or water current in the sea or freshwater body, the buoyancy of the pressure receiving plates, and the stoppers enable the rotary body to be reliably made to rotate and generate power, an angular range over which the pressure receiving plates pivot is 4° to 90° in range downward from a locus plane in the case where ends of the mounting sides of the pressure receiving plates rotate about the rotary shaft axis, a specific gravity of the pressure receiving plates, obtained by dividing the mass of the pressure receiving plates by the mass of that volume of pure water at 4° C., is made 0.95 to 0.99 of the specific gravity of the seawater or freshwater set in, and the rotary body is a circular cross-section vertical cylinder provided at the installation base to be able to rotate.
(2) The power generation apparatus utilizing water current energy according to (1), wherein the mounting frames have a plurality of horizontal frames aligned in the vertical direction and a plurality of vertical frames connecting the vertically aligned horizontal frames, the pressure receiving plates are attached to a top horizontal frame by butterfly hinges to be able to pivot, and the stoppers have top stoppers attached to top ends of the top horizontal frames and stopping top surfaces of pressure receiving plates by pushing downward and bottom stoppers provided at bottom horizontal frames so as to stop the pressure receiving plates from rotating by 90° or more.

Advantageous Effects of Invention

The plurality of pressure receiving plates, which are attached to be able to pivot at the top sides of the mounting frames attached radially to the rotary body, receive the pressure from the water current, the weight and buoyancy of the pressure receiving plates, and the lift of the pressure received due to rotation of the pressure receiving plates. However, according to the present invention, using the rotational phases of the pressure receiving plates, the balance of these forces can be changed and the rotational torque can be constantly obtained. Here, a phase angle of the mounting frame is defined as 0° when a direction of projection of the mounting frame shows the upstream direction of the water current (see "EAST" in FIG. 6 and "WEST" is FIG. 11). A rotational phase of the pressure receiving plate means a rotational angle, wherein the mounting frame with the pressure receiving plate rotates from the phase angle 0° by the pressure receiving plate moving under the force of the water current toward the stopped substantially vertical position. (This rotational direction of the rotational phase is called a "forward rotational direction.")

A pressure receiving plate at the rotational phase where the direction of flow of water current and direction of the mounting frame become perpendicular (90° and 270°), receives a strong pressure from the water current which in turn acts so that the free end of the pressure receiving plate moves in the downstream direction (see FIGS. 6 and 11). On the other hand, near the perpendicular rotational phase 90°, the pressure receiving plate pivots by the pressure received from the water current so that its free end becomes downward, but the pressure receiving plate is held substantially vertical by the stopping means (pressure receiving plate is pushed against the bottom stoppers 5a of the mounting frame). The strong pressure received from the water current acting on the pressure receiving plate at this phase gives a high rotational torque through the mounting frame to the rotary body 2 in order to try to make it rotate in the forward rotational direction. On the other hand, around the perpendicular rotational phase 270° or so, the pressure receiving plate is biased by the strong pressure received from the water current, and the lift due to the pressure received due to the buoyancy and rotation so that the free end becomes the horizontal direction and is stopped by the stopping means (top stopper 4c) at a light inclination where the free end becomes somewhat lower from the horizontal. At this phase, the force acting on the pressure receiving plate is small since it becomes substantially parallel with the direction of flow of the water current. The force making the mounting frame and rotary body rotate in the opposite direction to the forward rotational direction, is weak and the rotational torque making them turn in the opposite direction to the forward rotational direction is extremely small.

At the intermediate rotational phases of 135° to 225° and 315° (to 0°) to 45° in range, a pressure receiving plate becomes a floating state neither vertical nor horizontal. The rotational torque generated is small, that is, the torque resistance inhibiting rotation in the forward rotational direction is small. Accordingly, the pressure receiving plate of the present invention pivots in the forward rotational direction due to the strong rotational torque generated at the phase of 45° to 135°. The mounting frame and rotary body are reliably rotated and power generation by the power generator can be secured. The present invention is one in which even if the direction of flow of the water current changes, a rotational torque is generated by the strong water pressure at a rotational phase of 45° to 135° with respect to the flow of water current and the rotary body can be reliably rotated to generate power. The shift in the middle of the rotational phases of 135° to 225° and 315° (to 0°) to 45°, to the rotational phase 90° (vertical state) and 270° (horizontal state) of a pressure receiving plate can be performed smoothly by the force from the water due to the slight inclination due to the top stopper, buoyancy, and lift due to rotation.

According to the present invention, the structure of the rotational mechanism is comprised of an installation base, rotary body, mounting frames, pressure receiving plates attached to the mounting frames to be able to pivot, and top stoppers and bottom stoppers and other stopping means. That is, the structure is extremely simple, so has few breakdowns, can reliably operate, and further is low in cost and durable.

DESCRIPTION OF EMBODIMENTS

Figure 1:
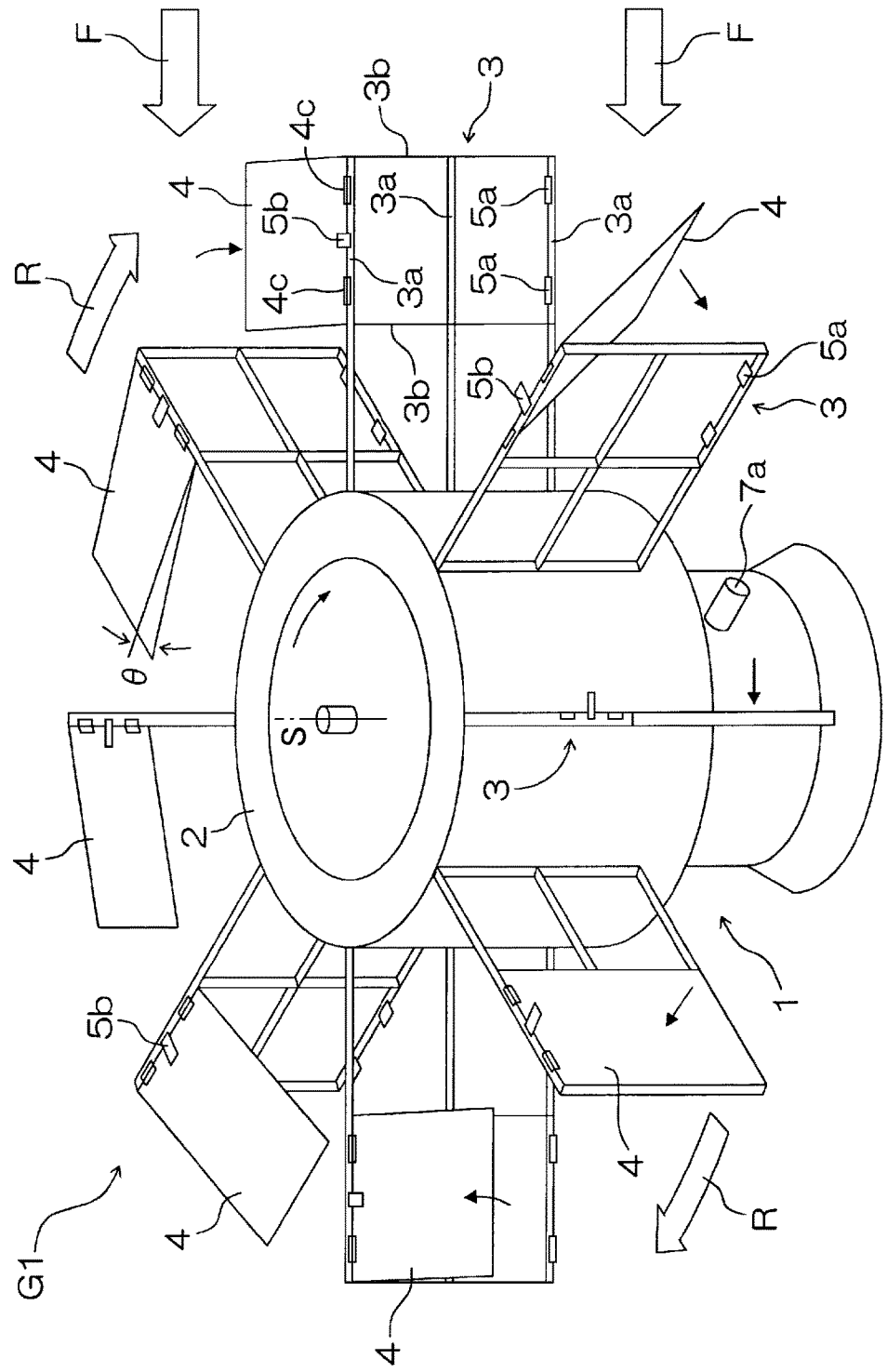
FIG. 1 is a perspective view of Example 1.

The direction of the rotary shaft axis S of the rotary body of the present invention is made substantially perpendicular to the direction of the maximum flow rate in the sea or freshwater installed in and is made such that the direction of the tidal current and freshwater current and the pressure receiving plate become substantially perpendicular at the rotational phase of 90°. In general, the tidal current and freshwater current often become substantially parallel with the seabed floor and freshwater bed surface, so the rotary shaft axis of the rotary body often becomes the vertical direction perpendicular to the seabed floor and freshwater bed floor installed on.

As the installation base of the present invention, there are a cylindrical and frustoconical or box shaped housing type set fixed on the seabed floor or freshwater bed floor in a fixed manner, a submerged seawater or freshwater truss structure type anchored to the seabed floor or freshwater bed floor, an attachment based type attached vertically into the sea and freshwater from a structure above the sea surface and freshwater surface (bridge, submerged tower, etc.), or an attachment base type attached vertically into the sea and freshwater from a float or boat anchored floating on the sea and freshwater surface.

The rotary body of the present invention is generally a cylindrical body which can rotate about the installation base, but it may also be a rotary body made from a skeleton framework. A structure which reduces the water resistance is selected.

A mounting frame of the present invention is a member sticking out radially from the rotary body in the substantially horizontal direction parallel to the installation surface. The mounting frame is subjected to force from a pressure receiving plate, so the mounting frame is comprised of a plurality of horizontal frames with single ends attached to the rotary body and a plurality of vertical frames connecting top and bottom horizontal frames. It is preferable that when the mounting frame turns, the water resistance be small and a high strength be held.

A pressure receiving plate of the present invention preferably uses sturdy metal plates or plastic plates as the front and back surface materials and is filled inside with a plastic foam material or honeycomb material. The specific gravity of the pressure receiving plate as a whole has a ratio with the specific gravity of 1.00 to 1.05 of seawater or freshwater slightly smaller than 1.0 and preferably 0.95 to 0.99 in range. If the specific gravity becomes too light, the buoyancy becomes greater and the force making the pressure receiving plate horizontal becomes stronger, so the descent of the free end becomes slower or the rise of it becomes faster, so this is not preferred. The pressure receiving plats may be plastic plates or composite plates with heavier metals or ceramics so long as lighter than the specific gravity of seawater and freshwater of 1.00 to 1.05.

The power generator of the present invention is generally structured to be provided inside of the installation base or rotary body, be held in a waterproof space, and obtain rotational force of the rotary body with respect to the installation base through a speed increasing gear mechanism.

The method of attaching a pressure receiving plate of the present invention to a top side of a mounting frame may be either a butterfly hinge or pivot hinge. The top side of the mounting frame need only be one enabling rotation of the pressure receiving plate.

As the stopping means of a pressure receiving plate of the present invention, the bottom end part of a mounting frame is provided with bottom stoppers which engage with the free end of the pressure receiving plate in a substantially vertical state and a top stopper at the top end of the mounting frame. The top stopper is made slightly lower in its free end than the horizontal (4° or more). The pressure receiving plate is structured so that will not pivot upward further in a state having an angle of inclination (around 5°). As a method other than a stopping means of the bottom stoppers and top stopper, there is also the method of limiting the angle of rotation of the pressure receiving plate at the pivot shaft. The angular range over which the pressure receiving plate pivots is preferably 4° to 90° in range downward from the locus plane H of the rotation path formed by one end of the pressure receiving plate at the attached side about the rotary shaft axis S (see FIGS. 6 to 8). This "plane H of rotation path" (see FIG. 6) indicates the virtual path plane H formed by the pivot shaft 4f of the butterfly hinge 4c rotating about the rotary shaft axis S of the substantially vertical rotary body (usually horizontal, but not limited to this). The angle downward from the plane H of rotation path means the inclination θ.

Figure 9:
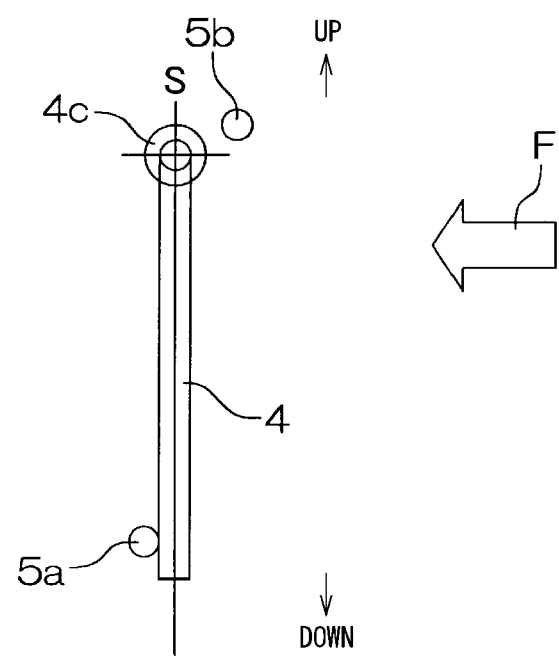
FIG. 9 is a view seen from the arrow B direction of FIG. 6 with the S-axial direction made vertical.
Figure 10:
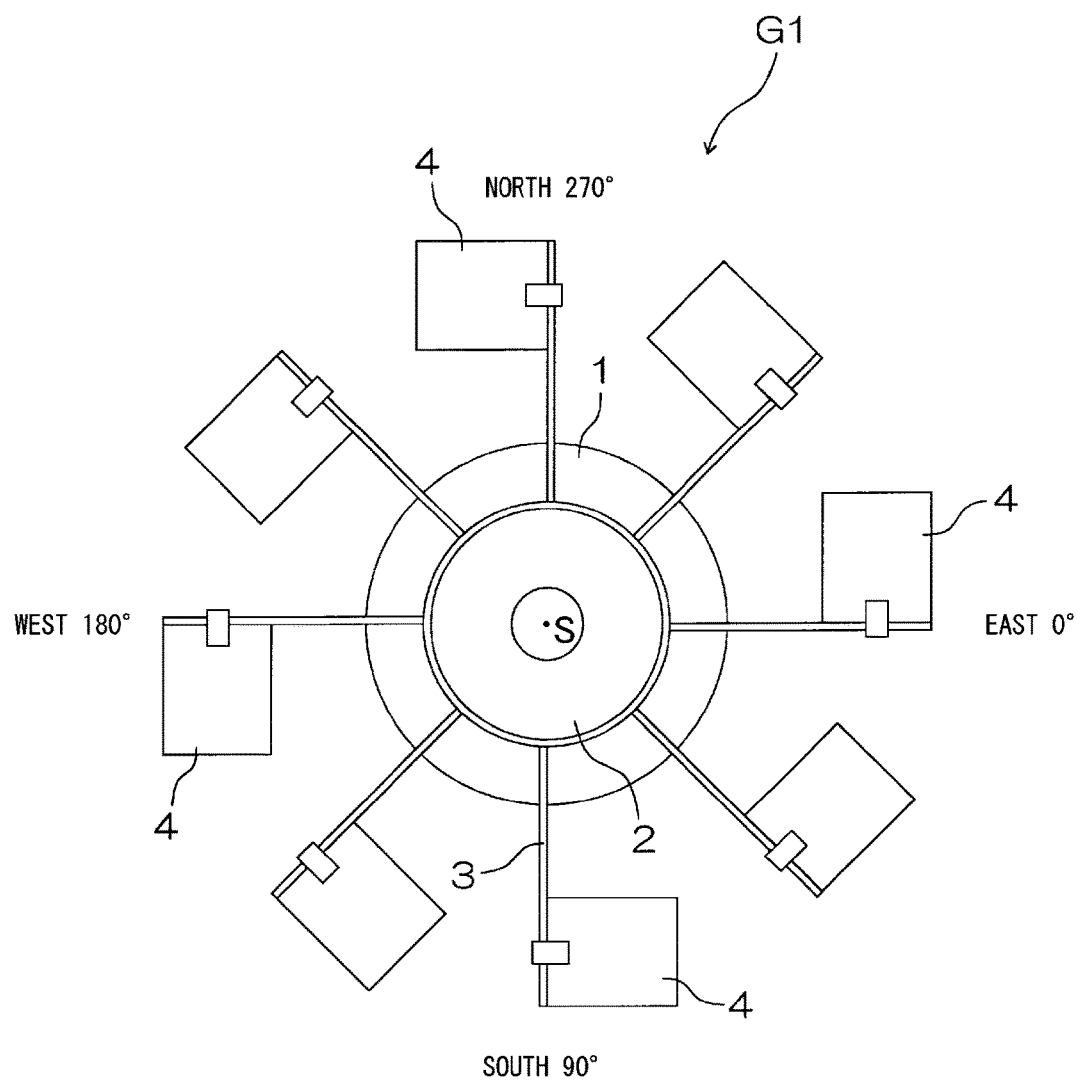
FIG. 10 is a plan view of the state of the pressure receiving plates in the case where the tidal current of Example 1 stops.

In the present invention, making the pressure receiving plates of the horizontally laid waterwheel the flap type is the most important characteristic. The pressure receiving plates are attached to the top sides of the mounting frames of the frames of a rotating turbine wheel to be able to pivot. Their specific gravity is made about 0.999 so that they slightly float. Due to the stopping means, at the position where the initial angle is 5 degrees or so, the plates stop rotating and are prevented from becoming horizontal. At the position of 90 degrees or so, rotation is stopped. In the low speed region where the flow rate of the water is 0 to 0.5 knot, there is little generation of force due to the water current, as shown in FIG. 10, all pressure receiving plates become substantially horizontal due to buoyancy, and no water pressure is received, so the pressure receiving plates do not turn. From around 0.8 knot, the water pressure striking the surfaces at an initial angle θ=5 degrees overcomes the buoyancy of the pressure receiving plates, the pressure receiving plates are made to rotate downward and are stopped by the stopping means of the bottom stoppers with the inclination 90 degrees, and the pressure receiving plates become perpendicular to the water current and receive strong water current pressure. By transmission of the received pressure to the mounting frames, the pressure receiving plates and rotary body continuously rotate. This state is shown in FIGS. 1, 6, 7, 9, and 11. The principle of the present invention and the operation of the pressure receiving plates have already been proven by good operation in water tank tests of the water flow.

Figure 6:
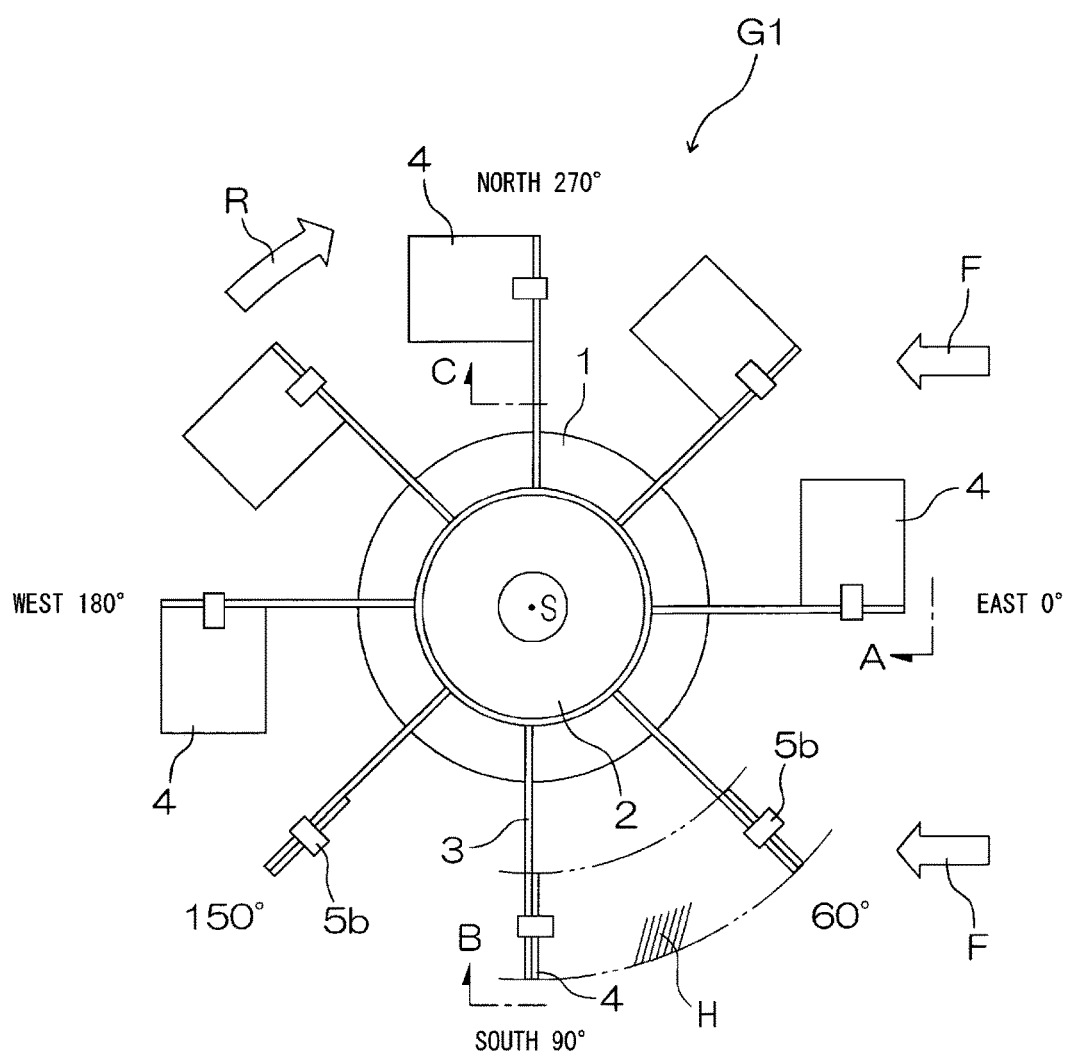
FIG. 6 is an explanatory view showing the state of the pressure receiving plate corresponding to a flow from the east (from the right side) in Example 1.
Figure 11:
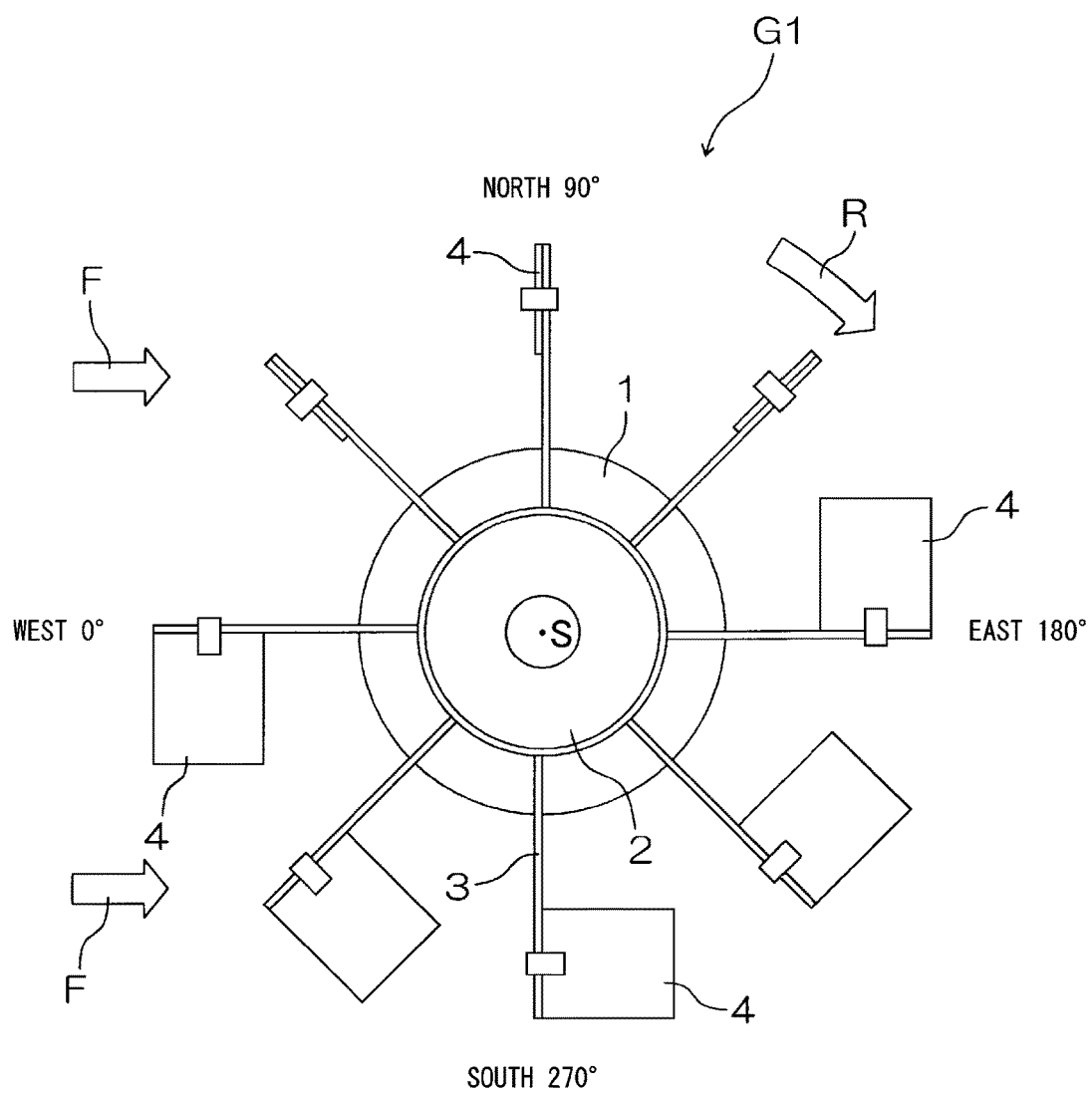
FIG. 11 is a plan view of the state of the pressure receiving plates in the case where the tidal current of Example 1 inverts (flow from west).
Figure 12:
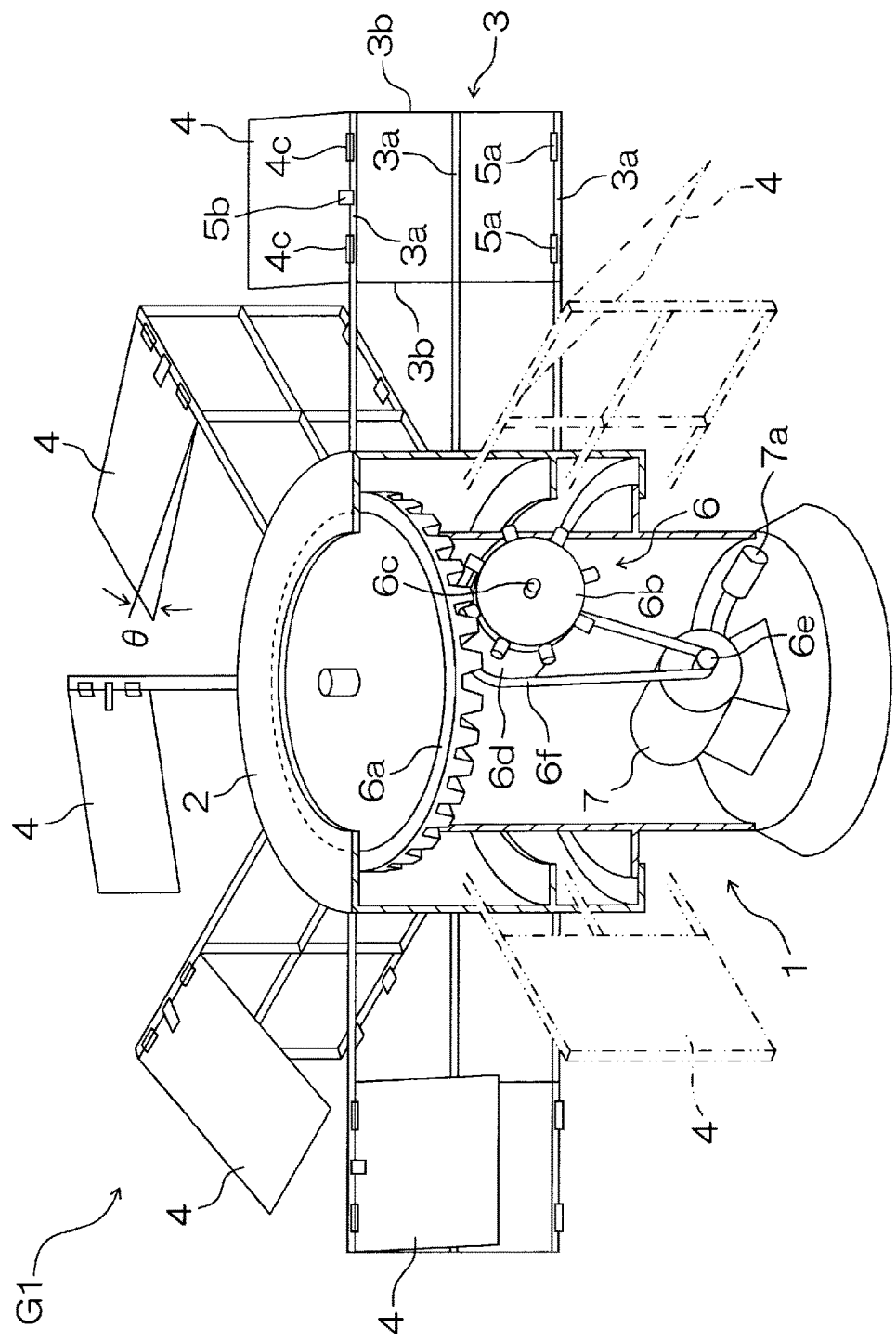
FIG. 12 is an explanatory view of a rotational mechanism of the power generator of Example 1.

The present invention does not require a special mechanism for handling changes in the direction of tidal current. The changes can be handled by just flap type pressure receiving plates. The rotary body can be rotated no matter what the direction of the tidal current. As shown in FIGS. 6 and 9, the south side pressure receiving plate receiving pressure of the current flow, that is, the flow from the east, becomes horizontal in phase as shown in FIG. 10 due to the buoyancy of the pressure receiving plate itself when the tidal current at the ebb of the tide. Next, as shown in FIG. 11, if changing to a flow from the west, the surface of the north side pressure receiving plate at the initial angle of 5 degrees receives pressure whereby it become perpendicular in inclination and at the north side the pressure receiving plate turns from the west to east. At this time, the south side pressure receiving plate becomes horizontal in phase, so the pressure receiving plate does not receive pressure. Due to this, the rotational direction of the waterwheel is constantly maintained at a certain rotational direction even if the direction of flow changes.

In the present invention, as means suitable for a sea area of a tidal flow rate of 2 knots to 1 knot and a depth of 40 m to 10 m or so, first, there are the propeller system and Darrieus turbine wheel type. Both are systems utilizing the lift of blades and are systems based on the theory that the amount of power generation is the square of the blade diameter times the cube of the flow rate. With these systems, the turbine wheels rotate about their horizontal axes and the supports holding the turbine wheels are vertical, so a deep depth and fast flow rate are necessary conditions. Compared with this, the present invention is structured adapted to ocean regions with shallow depths and low flow rates, so based on the approximation theory of a land-based undershot waterwheel, that is, amount of power generation=waterwheel diameter×(amount of water current/sec)×(efficiency, coefficient), this corresponds to a horizontal direction rotation waterwheel with a vertical axis laid flat. Not the lift acting perpendicularly to the direction of flow of the wing theory, but the parallel pressure and drag are utilized. In the present invention, compared with the propeller system in which the pressure receiving region is the entire circumference of the blade rotation, the pressure receiving region is half of the circumference of the rotation. To make up for this, an extra margin may be freely set for the waterwheel diameter and dimensions of the pressure receiving plates for the target power generation amount. Due to this, it is possible to obtain a structure adapted to actual conditions such as low tidal flow rates and shallow depths.

Next, let us try to set the general dimensions of the waterwheel for achieving the target power generation amount. Basically, this is based on the approximation theory of an undershot waterwheel cited earlier. This is set considering other theoretical formulas, a safety margin, balance, etc. At 1000 kW, when the waterwheel diameter is 50 m, the waterwheel blade width would be 10 m at a flow rate of 1 knot and 5 m at a flow rate of 2 knots. At 2000 kW, when the waterwheel diameter is 80 m, the waterwheel blade width would be 12 m at a flow rate of 1 knot and 6 m at a flow rate of 2 knots. At 100 kW, when the waterwheel diameter is 10 m, the waterwheel blade width would be 5 m at a flow rate of 1 knot and 3 m at a flow rate of 2 knots. In the above way, the power generation apparatus of the present invention becomes considerably long as per an ocean structure, but can be sufficiently practically realized if making careful structural calculations and designing the speed and speed increasing mechanism.

Figure 13:
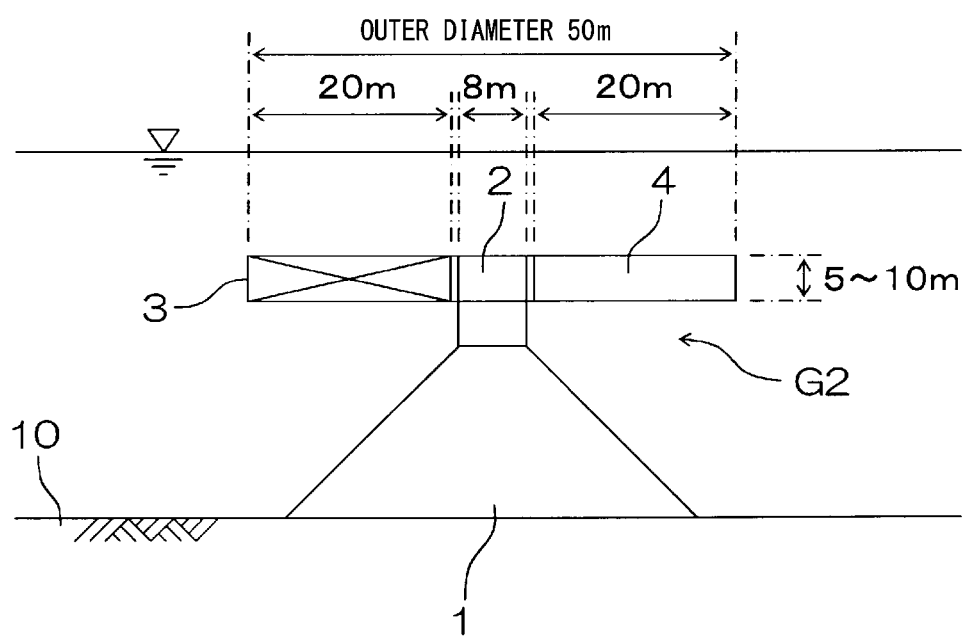
FIG. 13 is a front view showing Example 2 of 1000 kW power generation.

General structural calculations will be used to confirm the structural strength. For example, as shown in FIG. 13, if test calculated by 1000 kW and a waterwheel diameter of 50 m, a water-tight cylinder (fixed) fixed in the water and containing a 1000 kW power generator is made the center of waterwheel rotation. The cylinder (rotary body) diameter is made 8 m, and 20 m rotary blades (pressure receiving plates) are attached to rotary frames (mounting frames) around the cylinder. The rotary frames (mounting frames) are constructed by using nominal diameter 100 A SUS pipes (stainless steel pipes of Japan Industrial Standard) to make composite beams with bases of horizontal direction 2.5 m and vertical direction 5.0 m cross-sections and truss them together to make length 20 m booms. The torque generated when a 2 knot water current strikes a pressure receiving plate attached by a rotary hinge to this boom becomes 153,000 kgm. If dividing this torque by the section modulus of the base of a boom, the stress becomes about 6.5 kg/mm$^2$, so the structure becomes sufficiently stable and safe, but to further increase the safety factor, it is easy to additionally set ribs of suitable shapes etc. The installation base, rotary body, rotational speed, speed increasing mechanism, etc. can be achieved using already known art.

Finally, measures for stabilizing the posture of the power generation apparatus of the present invention in tidal current and freshwater current are necessary. For fishing grounds, the anchor cable system may be considered. The tidal flow rate is calculated as 2.0 knots. By suitably setting the overall buoyancy, anchor weight, and position of anchor cable to the values found by calculation as a result of test calculations setting the roughly calculated dimensions and weight of a 1000 kW type, the posture can be stabilized. In a rapid tidal current region of 2.0 knots or more, it becomes necessary to ensure a sufficient safety margin. To deal with waves during hurricanes, the tidal current power generation apparatus as a whole can be stabilized by sinking it to a position below the low tide position by 3.0 m. Measures against tidal waves should be separately studied. The seabed installation system enables more easily stabilization than the anchor cable system.

Below, examples of the present invention will be explained based on the drawings.

EXAMPLES

Example 1

Figure 2:
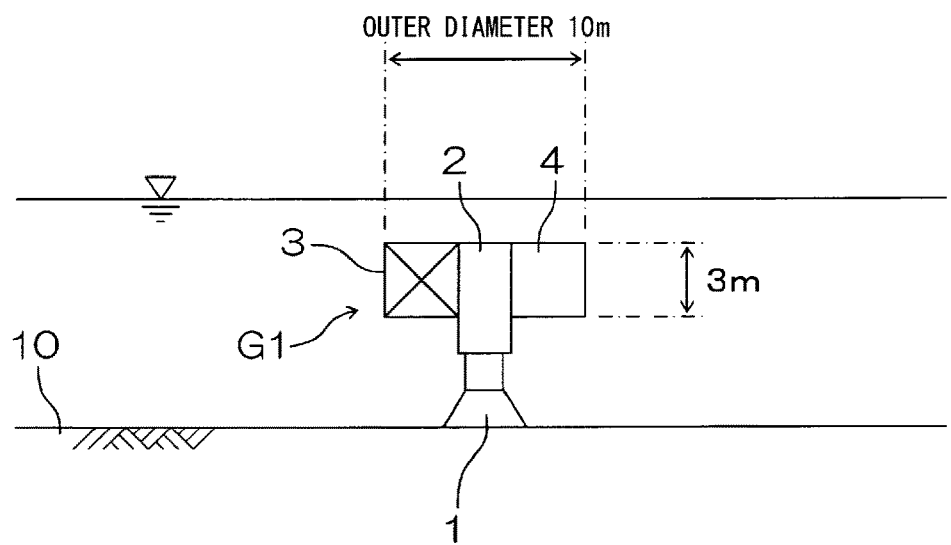
FIG. 2 is a front view of Example 1.
Figure 3:
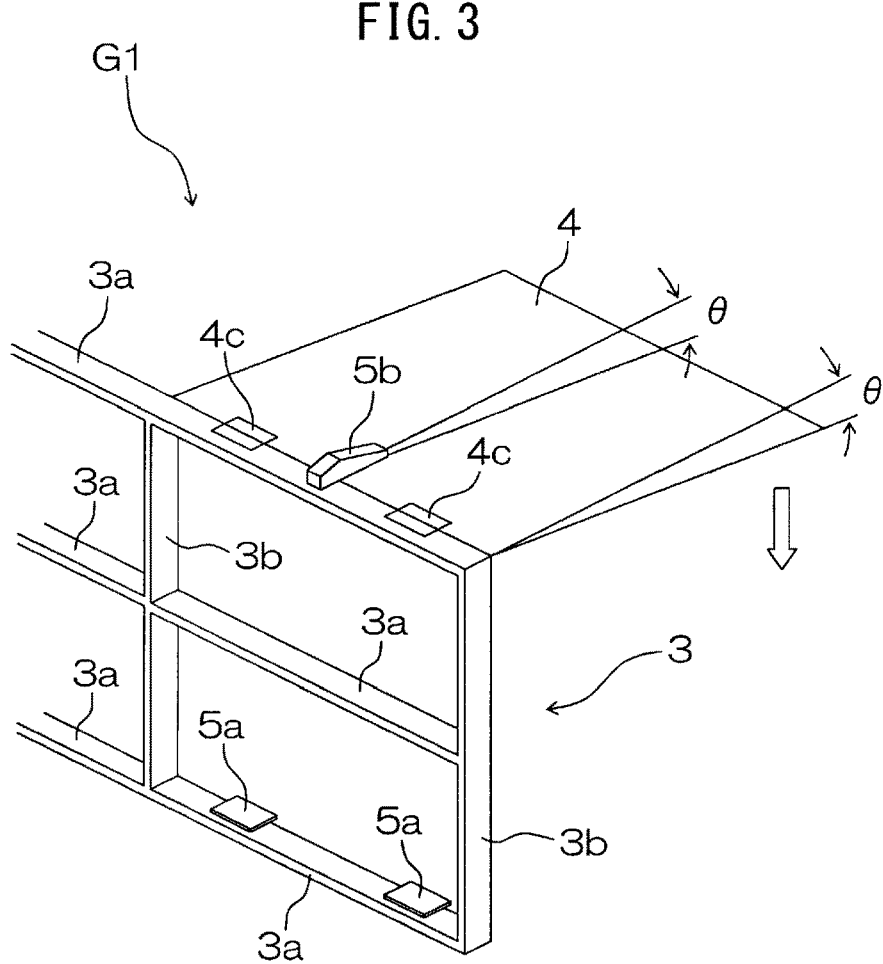
FIG. 3 is an explanatory view showing mounting of a pressure receiving plate of Example 1.

Example 1 shown in FIGS. 1 to 12 will be explained below. FIGS. 1 and 2 are views showing the overall appearance of Example 1. In the figure, G1 indicates a power generation apparatus of Example 1.

Figure 4:
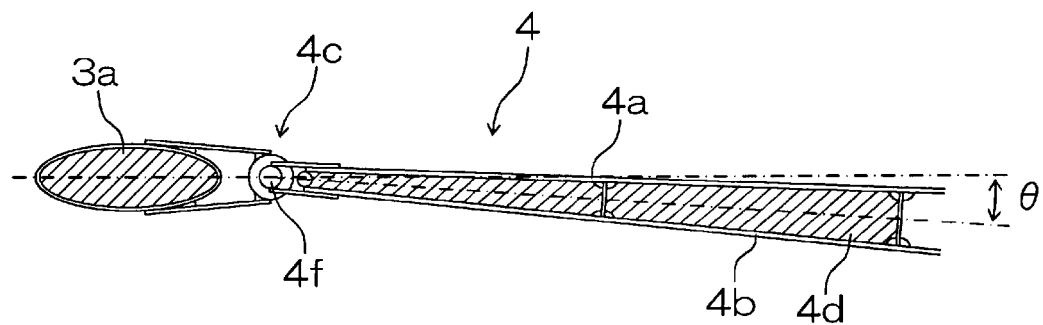
FIG. 4 is an explanatory view of a cross-sectional structure giving buoyancy to the pressure receiving plate of Example 1.

In FIGS. 1 and 2, 1 is an installation base set in a fixed manner on the seabed floor. Its top is comprised of a water-tight cylindrical part, while its bottom is a frustoconical shape. Reference number 2 is a vertical cylindrical shaped rotary body which is attached to the installation base 1 to become perpendicular to the surface where the installation base 1 is set and to be able to freely rotate about the (substantially vertical) rotational axis S. Reference number 3 are mounting frames of pressure receiving plates 4 provided at eight locations radially from the outer circumference of the same rotary body. These mounting frames 3 are respectively comprised of three upper and lower horizontal frames 3a extending in the radial direction from eight locations at 45° intervals of the outer circumference of the rotary body 2 and a plurality of vertical frames 3b connecting these horizontal frames 3a in the vertical direction. In FIGS. 1 and 2, 4 is a flap type pressure receiving plate which is attached to the top horizontal frame 3a of a mounting frame 3 by a butterfly hinge 4c to be able to pivot and has a specific gravity of 0.999. In FIG. 1, reference number 5a is a stopping means comprised of bottom stoppers which are attached to the bottom side member of a bottom horizontal frame where the pressure receiving plate 4 is stopped at a substantially vertical state of 90°. Reference number 5b is a stopping means comprised of a top stopper which is attached to an upper horizontal frame 3a holding down the top surface of the pressure receiving plate 4 so that the pressure receiving plate 4 is inclined downward from the horizontal by 5°. Reference number 6 is a speed increasing mechanism which transmits the power of rotation of the rotary body 2 corresponding to a fixed installation base 1 to the power generator 7. Reference number 6a is a ring gear provided at the top of the inside of the rotary body 2. Reference number 6b is a flat gear engaging with the ring gear 6a, 6c is a rotary shaft of the flat gear 6b, 6d is a belt pulley attached to the rotary shaft 6c, 6e is a belt pulley attached to the rotary shaft of the power generator 7, and 6f is a belt which is stretched between the belt pulley 6d and the belt pulley 6e. Reference number 7 is a power generator operating by the rotational force of the output side of the speed increasing mechanism 6. Reference number 7a is an undersea cable which contains power transmission lines and control signal lines of the power generator 7 and sends power to the land. In the figure, reference number 10 is the seabed floor installed on, F is the flow of tidal current, R is the rotational direction of the rotor 2, and θ is the inclination of the pressure receiving plate 4 due to the top stopper 5b and is set to 5 degrees. In the figure, the black arrows show the directions of forces acting on the pressure receiving plate 4.

Figure 5:
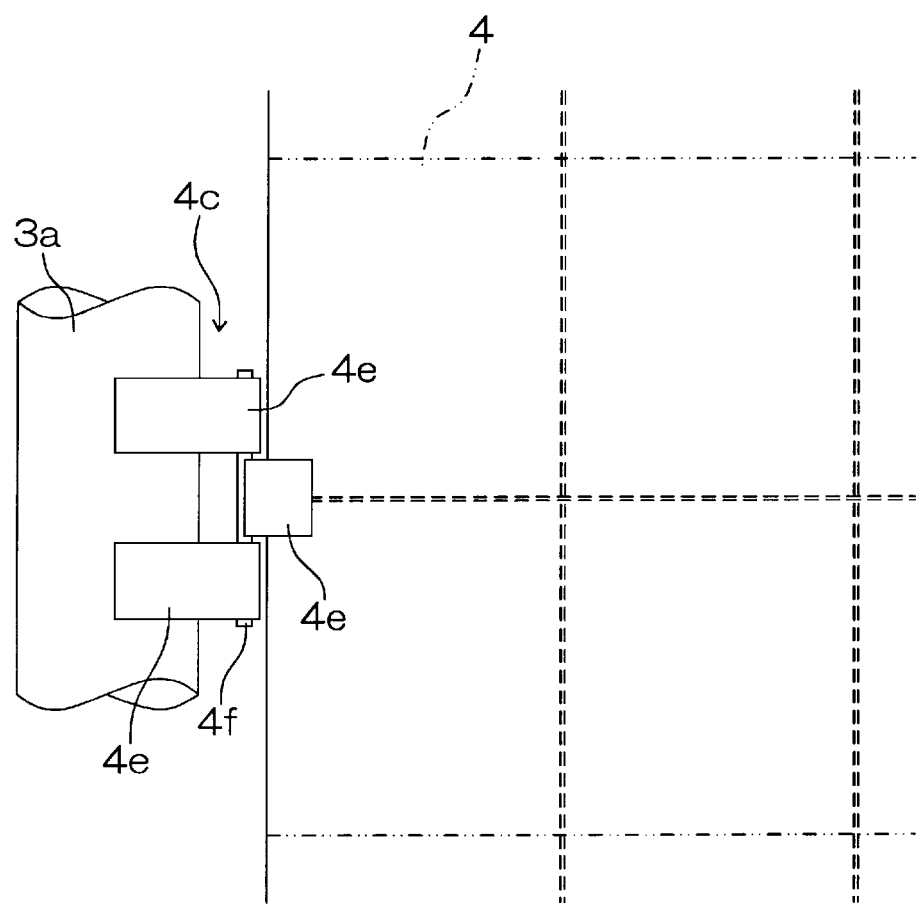
FIG. 5 is an explanatory view of a mounting structure of the pressure receiving plate of Example 1.

Each pressure receiving plate 4 of Example 1, as shown in FIG. 4, has a maximum thickness of 200 mm by flowline cross-section and is comprised of 1 mm thick integrally joined front and back SUS thin plates 4a, 4b into which plastic foam 4d is injected to make the specific gravity lower than seawater or 0.999. FIG. 5 is an explanatory view showing the mounting structure of a pressure receiving plate 4. The butterfly hinge 4c is comprised of three mounting members 4e and a pivot shaft 4f.

The dimensions of the parts in Example 1 will be shown next. The diameter of the rotary body 2 is 2 m and the height 5 m. The outside diameter of the mounting frame 3 is 10 m and the height 3 m. The length of a pressure receiving plate 4 is 3 m and the width (depth) is 3 m or so.

The power generation apparatus G1 of Example 1 is a power generation apparatus installed on the seabed floor 10 of a region with a shallow depth of about 10 m and a flow rate of the tidal current of 1 knot.

The flap type pressure receiving plate 4 of Example 1 is given slight buoyancy (specific gravity 0.999) so that when the flow rate of the tidal current is small or there is no current, this buoyancy causes the pressure receiving plate 4 to pivot in a direction becoming horizontal. On the other hand, even if the flow of water of the tidal current enters the mounting frame 3, the acting fluid pressure is small. The buoyancy is larger than the force F of the received pressure of the pressure receiving plate 4 due to the flow of tidal current, so the free end of the pressure receiving plate 4 inclines so as to float up slightly in the upward direction. That is, if the buoyancy is larger than the force F of the received pressure, the pressure receiving plate 4 is held by the top stopper 5b in a state of an inclination of 5° from the horizontal. This state is shown in FIG. 10. This state is the state where the received pressure from the tidal current is the smallest. The pressure receiving plate 4 generates almost no rotational torque of the rotary body 2 and the power generator 7 does not generate power.

Next, if the flow rate of the tidal current becomes greater, the state of the pressure receiving plate 4 becomes as shown in FIGS. 6, 7, 8, and 9. If the rotational phase of the pressure receiving plate 4 changes from 0° to 45°, tidal current flows on the top surface of the inclined pressure receiving plate 4 whereupon the pressure receiving plate 4 is pushed downward. The water pressure overcomes the buoyancy and lifting water pressure due to pivoting of the pressure receiving plate 4 (lift) and gradually pushes the pressure receiving plate 4 downward to make the pressure receiving plate 4 turn in the vertical direction. When the pressure receiving plate 4 is at the 90° rotational phase, it is stopped by the bottom stoppers 5a and is held in a substantially vertical state. Between the rotational phases (60° to 150°), the pressure receiving plate 4 receives the tidal current substantially perpendicularly whereby a strong force and rotational torque are given to the mounting frame 3 and rotary body 2 and these are made to pivot in the clockwise direction (forward rotation direction). Close to the rotational phase 180° of the pressure receiving plate 4, the pressure receiving plate 4 generates lift due to the flow rate of the tidal current. Together with the buoyancy, the pressure receiving plate 4 pivots in the horizontal direction. At the rotational phase 270°, it is held in state by the top stopper 5b 5° downward from the horizontal. In this state, the pressure receiving plate 4 becomes substantially parallel to the flow of tidal current and therefore the water resistance with respect to rotation of the pressure receiving plate 4 becomes the minimum. In this above way, the rotary body 2 receives the strong rotational torque at the rotational phase of around 90° at the pressure receiving plate 4, so the rotary body 2 can reliably rotate in the clockwise direction (forward rotational direction).

Figure 7:
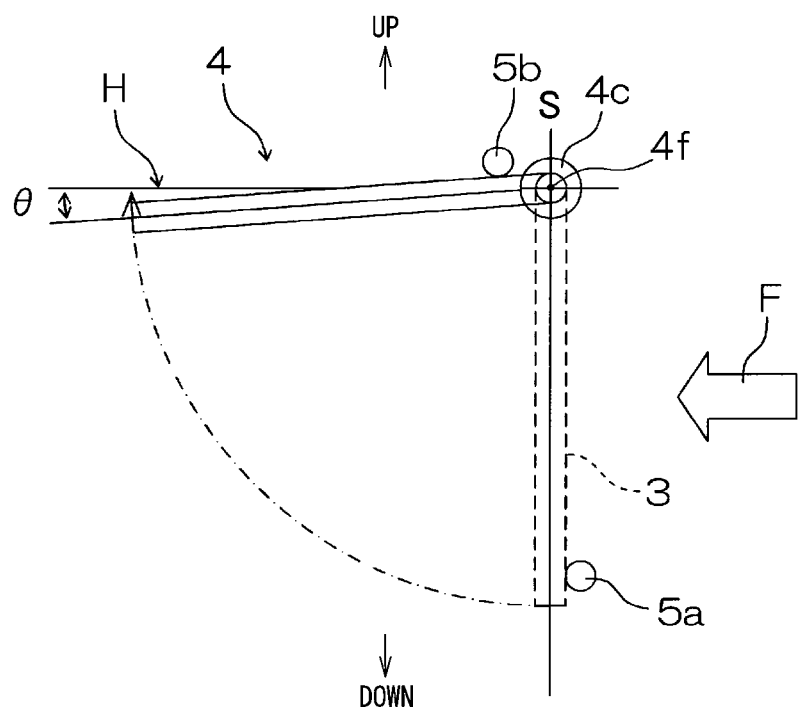
FIG. 7 is a view seen from the arrow C direction of FIG. 6 with the S-axial direction made vertical.
Figure 8:
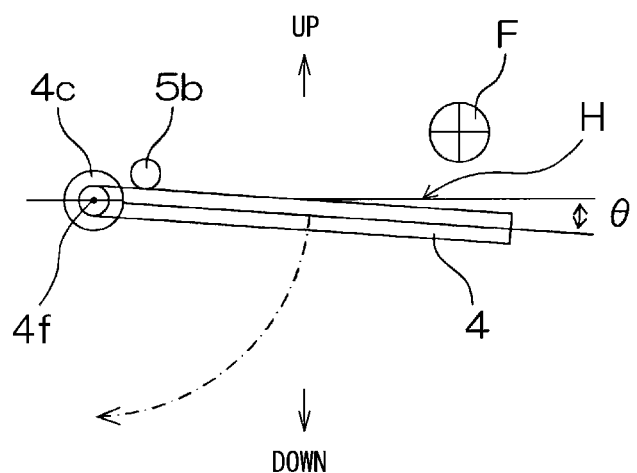
FIG. 8 is a view seen from the arrow A direction of FIG. 6 with the S-axial direction made vertical.

FIG. 9 shows the state at the rotational phase 90° of the pressure receiving plate 4. FIG. 8 shows the state close to the rotational phase 0° of the pressure receiving plate 4. FIG. 7 shows the state of the rotational phase 270° of the pressure receiving plate 4. Further, FIG. 1 shows the state of the pressure receiving plate 4 at different rotational phases. The black arrow marks in FIG. 1 show the direction of force. These show that forces act downward close to the rotational phase 0° and upward close to 180°.

According to experiments on the power generation apparatus G1 of Example 1 in a water flow tank, if the flow rate is 0 to 0.3 m/s, the pressure receiving plate 4 becomes a completely horizontal state and the rotary body 2 does not rotate. Further, if the flow rate is 0.4 m/s, the pressure receiving plate 4 becomes the 90° rotational phase and the vertical direction whereupon the rotary body 2 and pressure receiving plate 4 start to rotate.

FIG. 11 shows the state of the pressure receiving plate 4 in the case of the same power generation apparatus G1 as Example 1 and a tidal current from the west direction. In this case as well, in the same way as the flow of tidal current from the east direction, at the north side 90° rotational phase, the pressure receiving plate 4 becomes substantially vertical and receives the maximum pressure. At the south side 270° rotational phase, the pressure receiving plate 4 becomes substantially parallel to the tidal flow and horizontal in state. Due to this, in the same way as the east direction tidal current, the rotary body 2 and the pressure receiving plate 4 are rotated in the clockwise direction and can generate power. In this way, no matter from which direction the flow of tidal current comes—either east, west, south, or north, similarly strong rotational torque can be generated.

In the Example 1, if the flow rate of the tidal current is 2 knots, if the outside diameter of the rotational path of the pressure receiving plate 4 is 10 m and the depth is made 3 m, a rotational ability similar to a flow rate of 1 knot and a depth of the pressure receiving plate of 5 m can be obtained.

Example 2

Figure 14:
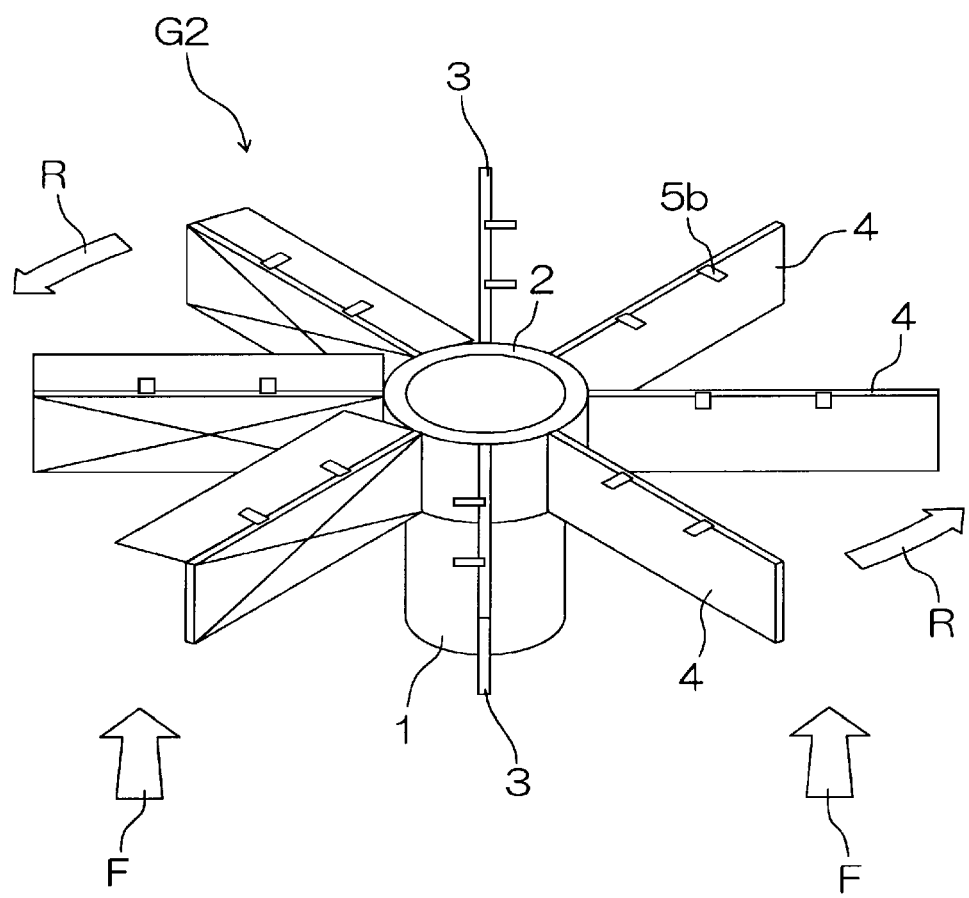
FIG. 14 is a perspective view of Example 2.
Figure 15:
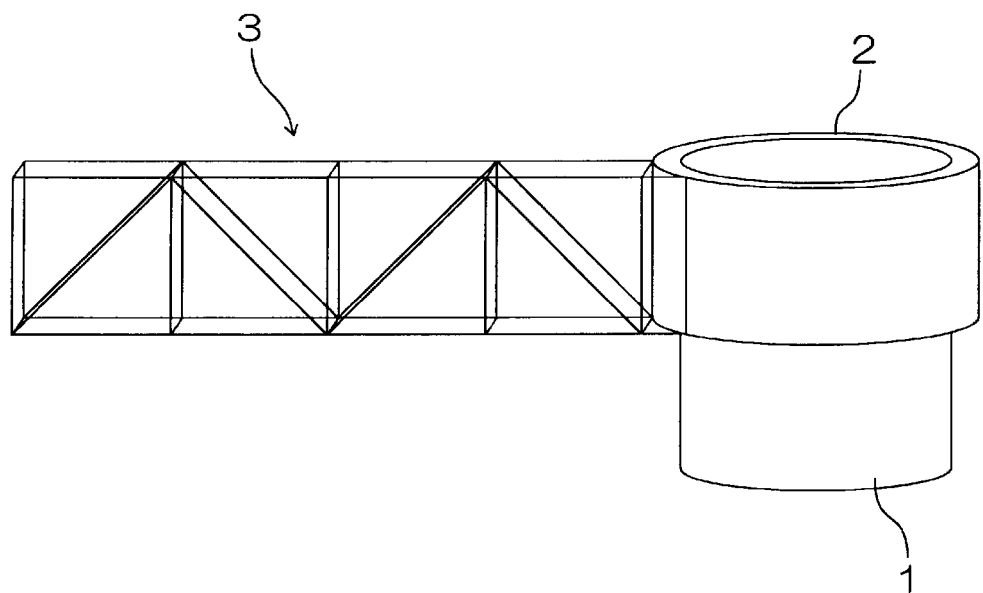
FIG. 15 is an explanatory view showing the structure of a horizontal arm of Example 2.
Figure 16:
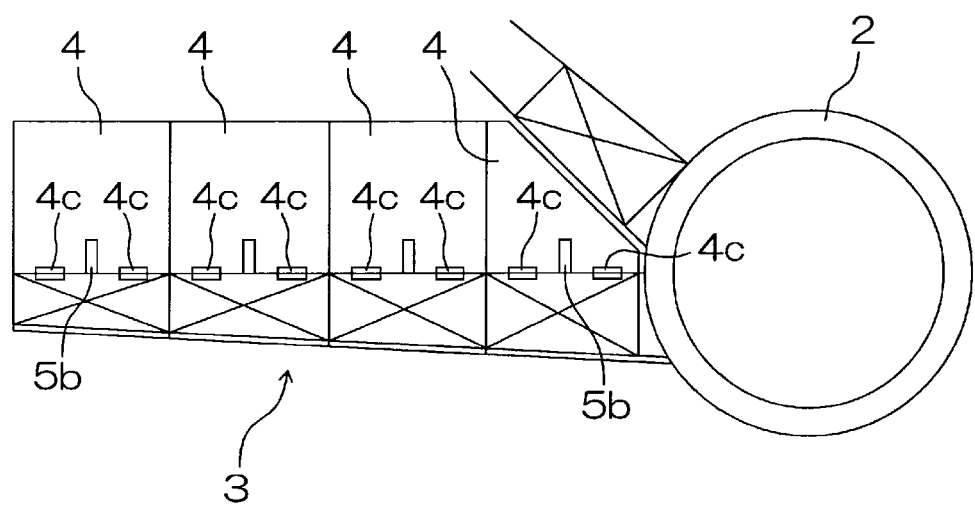
FIG. 16 is a front view showing attachment of the horizontal arm of Example 2.

The power generation apparatus G2 of Example 2 shown in FIGS. 13 and 14 is one example of the 1000 kW output type and is set on the seabed at a depth of about 28 m. The diameter of the rotational path of the outer edges of the pressure receiving plates 4 is 50 m. The depth of the pressure receiving plates 4 is about 10 m in the case of a flow rate of tidal current of 1 knot and about 5 m in the case of a flow rate of 2 knots. In FIG. 13, the reference numbers are made the same as the reference numbers of Example 1. The action and effect of Example 2 are similar to Example 1 other than the output becoming a large output of 1000 kW. Further, the speed increasing mechanism 6 of Example 2 has to be a high efficiency one.

The output power generation amount is calculated roughly as follows:

Water pressure received by pressure receiving plate 4:$F$=fluid density×flow rate×(flow rate−rotation peripheral speed)     formula 1

F at time of startup (rotation peripheral speed 0 m/s) =102×(100 m² ×1.0 m/s) ×(1.0 m/s - 0 m/s) =10,200 kgf
Maximum torque T at time of startup due to water pressure
  F =F ×distance until pressure center 15 m =153,000 kgf·m
kW is calculated by setting an appropriate speed up ratio and making "n" units of rpm units.

$$kW = 1/975 \times n \times T = 1/975 \times 6.37 \times 153{,}000 = 1000 \text{ kW}$$

Further, at the time of rotation, the rotation peripheral speed decreases and, from the above formula 1, F decreases, but the F of the other two pressure receiving plates 4 at the pressure receiving side is added whereby in total the torque T required for 1000 kW is maintained and continuous rotation is secured.

Calculation of Strength
Test calculation of structural strength of mounting frame 3: Calculated using nominal diameter 150 A (9.3 t, "t" is thickness (mm) of pipe by JIS standard) SUS (Japan Industrial Standard, stainless steel material) as pipe composite beams.
Section modulus Z of composite beam (horizontal direction) with cross-section of beam base of horizontal 2.5 m, vertical 5.0 m=23,235 cm³
Maximum torque $T$ of startup=Maximum bending moment (horizontal direction) $M$=153,000 kg·m
Maximum stress $M$ of beam base/$Z$=153,000 kg·m/23,235 cm³=6.5 kg/mm²
so the structure becomes sufficiently safe and stable. Further, to reduce the water flow resistance of the beams, 150 A SUS pipe is compressed to an oval shape. After compression, the section modulus in the horizontal direction after compression increases slightly, so the strength also increases. Furthermore, the safety factor increases, so suitable rib materials etc. may also be provided.

Example 3

Figure 17:
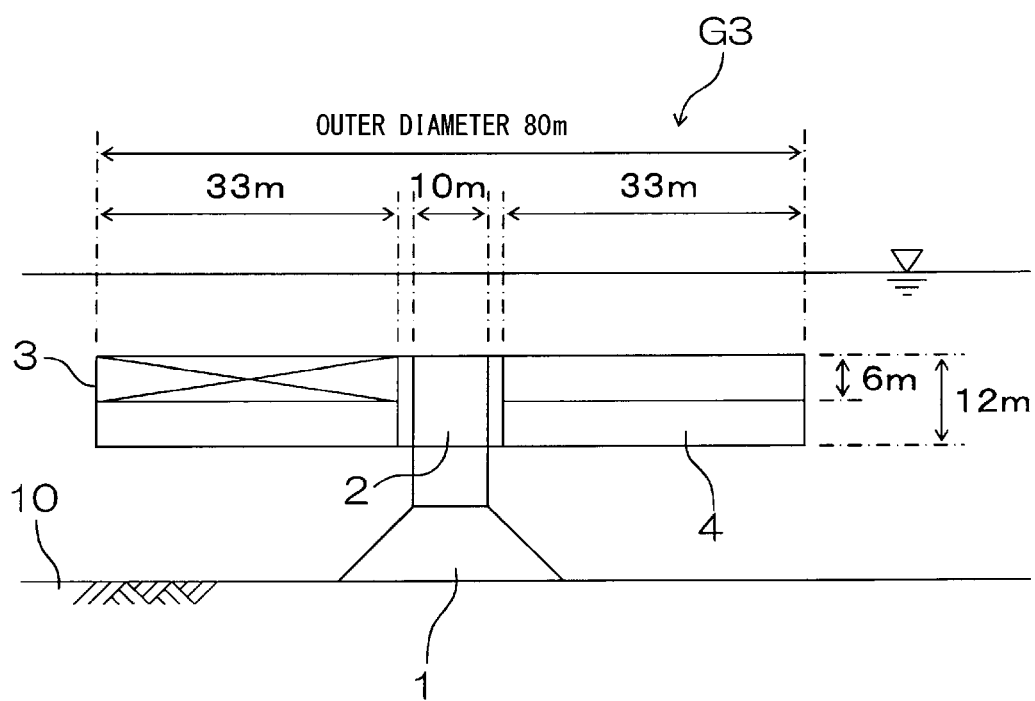
FIG. 17 is an explanatory view showing the dimensions of a 2000 kW power generation apparatus of Example 3.
Figure 18:
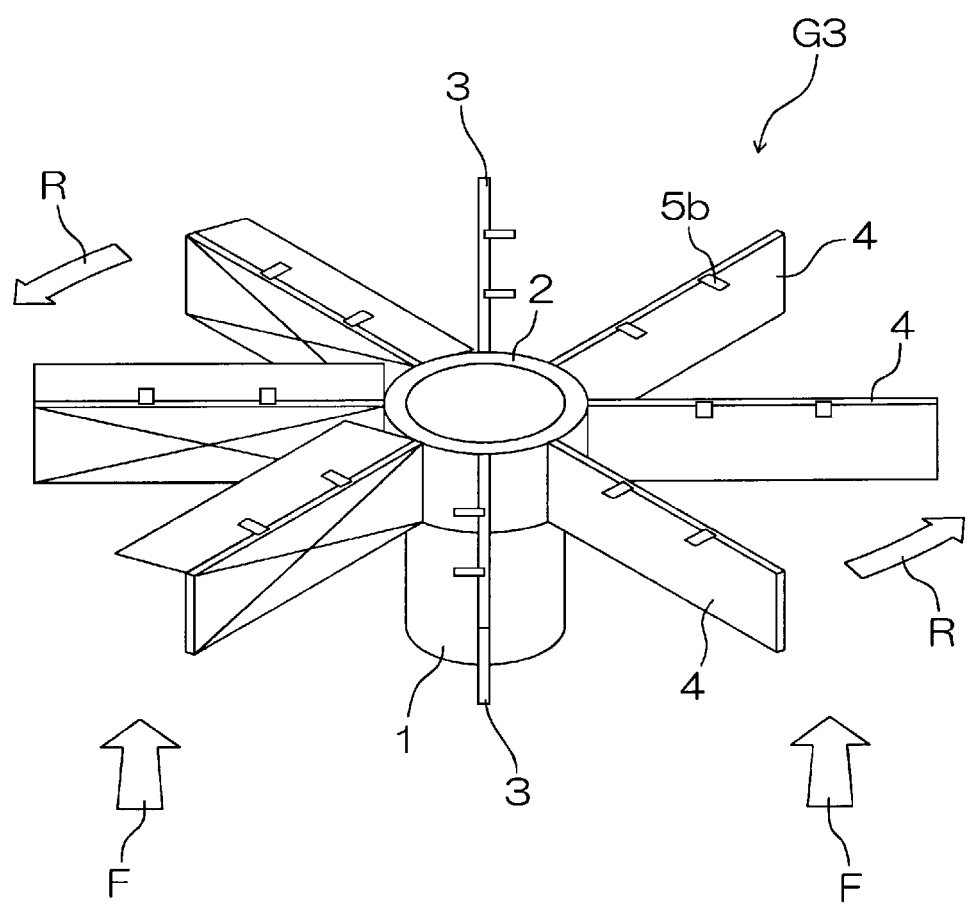
FIG. 18 is a perspective view showing a power generation apparatus of Example 3.

Example 3 shown in FIGS. 17 and 18 is one example of an apparatus installed on the seabed at a depth of about 32 m and generating 2000 kW or power. The diameter of the rotational path of the outer edge of the pressure receiving plate 4 is about 80 m. The depth of the pressure receiving plate 4 is 12 m if a tidal current of a flow rate of 1 knot, while is 6 m or so if a tidal current of a flow rate of 2 knots. The reference numbers are shared with Example 1. The action and effect of Example 3 is an output of an extremely large 2000 kW. The rest are the same as Example 1. For the speed increasing mechanism 6, a further higher efficiency becomes required.

Setting of Dimensions of Pressure Receiving Plates
The target power generation amounts and the sizes of the pressure receiving plates 4 (deemed waterwheels) may be freely set in accordance with the flow rate of the tidal current.

INDUSTRIAL APPLICABILITY

The present invention mainly generates power from the tidal current energy of the seabed, but can also be installed at riverbeds of large rivers with strong currents so as to generate power.

REFERENCE SIGNS LIST

G1, G2, G3. power generation apparatuses of examples
1. installation base
2. rotary body
3. mounting frame
3a. horizontal frame
3b. vertical frame
4. pressure receiving plate
4a, 4b. thin plate
4c. butterfly hinge
4d. plastic foam
4e. mounting member 4f. pivot shaft
5a. bottom stopper
5b. top stopper
6. speed increasing mechanism
6a. ring gear
6b. flat gear
6c. rotary shaft
6d. belt pulley
6e. belt pulley
6f. belt
7. power generator
7a. undersea cable
10. seabed floor
F. flow direction of tidal current
H. rotation path
R. rotation direction of rotary body
S. rotary shaft axis
θ. inclination

The invention claimed is:

1. A power generation apparatus utilizing water current energy comprising:
   an installation base installed in the sea or a freshwater body,
   a rotary body mounted to said installation base and configured to rotate relative to the installation base, and
   a power generator generating power by rotation of said rotary body with respect to said installation base, and the power generator is provided inside of the rotary body, wherein
   a rotary shaft axis of said rotary body is set in a vertical direction being substantially perpendicular to a flow plane of water current in the sea or in the freshwater body where the rotary body is set,
   said rotary body has a plurality of mounting frames attached from the rotary body radially, said mounting frames having first ends of flat-plate-shaped pressure receiving plates attached to the mounting frames to be able to pivot at top side positions offset from said rotary shaft axis, and a specific gravity of said pressure receiving plates is set smaller than the specific gravity of the seawater or freshwater where the apparatus is set so as to enable generation of buoyancy in said pressure receiving plates in the sea or in the freshwater body,
   stoppers are provided for limiting ranges of angle of pivot of said pressure receiving plates,
   output power of said power generator is transmitted by cable to land close to said installation base or a ship on the sea or freshwater body,
   force generated at said pressure receiving plates due to tidal current or water current in the sea or freshwater body, the buoyancy of said pressure receiving plates, and said stoppers enable the rotary body to be reliably made to rotate and generate power,
   an angular range over which said pressure receiving plates pivot is 4° to 90° in a range downward from a locus plane when ends of the mounting sides of said pressure receiving plates rotate about said rotary shaft axis,
   a specific gravity of said pressure receiving plates, obtained by dividing the mass of said pressure receiving plates by the mass of a volume of pure water at 4° C., is made 0.95 to 0.99 of the specific gravity of the seawater or freshwater in which the rotary body is set, and
   said rotary body is structured as a circular cross-section vertical cylinder which is provided at said installation base so as to rotate relative to the installation base.

2. The power generation apparatus utilizing water current energy according to claim 1, wherein
   the mounting frames include a plurality of horizontal frames aligned in the vertical direction and a plurality of vertical frames connecting the vertically aligned horizontal frames,
   the pressure receiving plates are attached to a top horizontal frame by butterfly hinges to be able to pivot, and
   the stoppers include top stoppers, which are attached to top ends of the top horizontal frames and configured to stop top surfaces of pressure receiving plates by pushing downward, and bottom stoppers provided at bottom horizontal frames so as to stop said pressure receiving plates from rotating by 90° or more.

* * * * *